(12) United States Patent
Matthews

(10) Patent No.: US 6,330,513 B1
(45) Date of Patent: Dec. 11, 2001

(54) PROSPECTING TECHNIQUE

(75) Inventor: Larry Matthews, Calgary (CA)

(73) Assignee: Noranda Inc. (CA)

( * ) Notice: Subject to any disclaimer, the term of this patent is extended or adjusted under 35 U.S.C. 154(b) by 0 days.

(21) Appl. No.: 09/295,378

(22) Filed: Apr. 21, 1999

(51) Int. Cl.$^7$ .................................................. G01V 3/00
(52) U.S. Cl. .................................................. 702/2; 702/14
(58) Field of Search ............................ 367/9, 73; 702/5, 702/2, 16, 14; 369/90

(56) References Cited

U.S. PATENT DOCUMENTS

| | | | |
|---|---|---|---|
| 4,393,488 | * 7/1983 | Gassaway et al. | 367/75 |
| 4,878,205 | * 10/1989 | Gelchinsky | 367/61 |
| 5,170,377 | * 12/1992 | Manzur et al. | 367/73 |

OTHER PUBLICATIONS

Adam et al., 3D Seismic Data Processing for Mineral Exploration, pp. 1–8, Apr. 1996.*
Keynote Session, Paper 7, "3–D Seismic Exploration".
Seismic Methods in Mineral Exploration, Paper 49, "Physical Properties and Seismic Imaging of Massive Sulphides".
Seismic Methods in Mineral Exploration, Paper 50, "Refection Seismics for Gold, Platinum and Base Metal Exploration and Mining in Southern Africa".
Seismic Methods in Mineral Exploration, Paper 52, "Structurally Controlled Mineralization in Australia–How Seismic Profiling Helps Find Minerals: Recent Case Histories".
Seismic Methods in Mineral Exploration, Paper 54, "Seismic Exploration for VMS Deposits, Matagami, Quebec".
Seismic Methods in Mineral Exploration, Paper 55, "Development of 3–D Seismic Exploration Technology for NI–Cu Deposits, Sudbury Basin".
Seismic Methods in Mineral Exploration, Paper 56, "Seismic Exploration of the Manitouwadge Greenstone Belt, Ontario".
Seismic Methods in Mineral Exploration, Paper 59, "Seismic Refection Imaging of a Shallow, Fault–Controlled VMS Deposit in the Matagami Mining Camp, Quebec".
Seismic Methods in Mineral Exploration, Paper 61, "Full Waveform Acoustic Logging Applications in Mineral Exploration and Mining".
Seismic Methods in Mineral Exploration, Paper 53, "Sedimentary–Hosted Mineral Deposits: High–Resolution Seismic Survey in the Athabasco Basin".

* cited by examiner

Primary Examiner—Jay Patidar
Assistant Examiner—Victor J. Taylor
(74) Attorney, Agent, or Firm—Katten Muchin Zavis

(57) ABSTRACT

Disclosed herein is a technique of prospecting for deep massive sulfide ore bodies, comprising the steps of selecting a geologic region which is substantially acoustically transparent; directing seismic waves at the region and collecting reflected or diffracted waves therefrom; and analyzing the collected waves for the presence of the massive sulfide ore bodies.

10 Claims, 3 Drawing Sheets

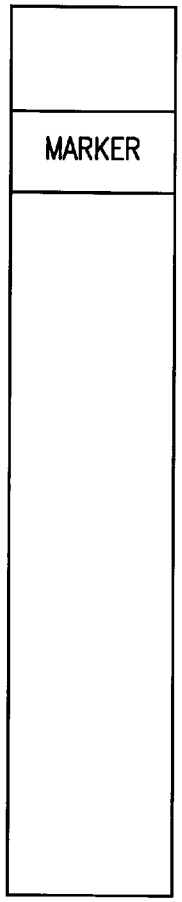
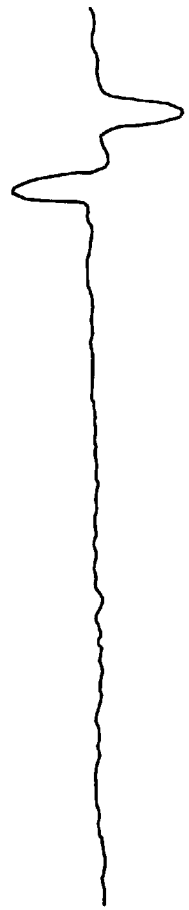
FIG. 1d
FIG. 1e

PROSPECTING TECHNIQUE

The present invention relates to mineral exploration and, and more particularly to methods of detecting massive sulphide deposits by the use of seismic reflection surveys.

BACKGROUND OF THE INVENTION

Multi-dimensional seismic reflection survey techniques, for example two dimensional (2-D) and three dimensional (3-D) seismic reflection survey techniques, have allowed the petroleum industry to generate remarkably accurate subsurface models to discover oil and gas deposits several thousand meters below the earth's surface, making deep oil drilling an economically viable procedure.

The minerals industry has made a considerable investment in multi-dimensional seismic reflection techniques to adapt the procedure for detecting the presence of massive sulphide deposits. However, the use of multi-dimensional seismic technologies by the minerals industry has thus far met with comparatively less success. In most cases, a massive sulphide will be extremely difficult to discern amongst the other strata of the geological region being explored.

To date, mineral exploration using seismic reflection surveys has been typically done on broad spectrum of geological terrain known to be potential sites for massive sulphides. Unfortunately, many of these regions exhibit poor signal to noise conditions. This relatively poor data has been found to be an inherent feature in multi-dimensional seismic exploration for massive sulphides. Experts in the field have worked diligently to overcome these problems by using state-of-the-art acquisition and processing strategies derived from the petroleum industry, hoping to filter out the noise and to generate an accurate, dependable subsurface geological model based on the remaining relatively poor acoustic signature of the massive sulphide deposit. With this goal in mind, experts have developed a number of sophisticated procedures which have been published in a number of leading mining journal articles.

However, these investigations have thus far not yielded significant useful results.

It is an object of the present invention to provide a novel technique for prospecting for massive sulphides.

SUMMARY OF THE INVENTION

Briefly stated, the invention involves a technique of prospecting for massive sulphide ore bodies, comprising the steps of:
- selecting a geologic region which is substantially acoustically transparent;
- directing seismic waves at the region and collecting reflected waves therefrom; and
- analyzing the reflected waves for the presence of the massive sulphide ore bodies.

Preferably, the step of analyzing the reflected waves includes the step of generating a multi-dimensional seismic data set, which may be two dimensional, such as a that known as a 2-D section or three dimensional such as a 3-D volume or cube. The term multi-dimensional also includes the known 2-D technique referred to as vertical seismic profiling.

In another of its aspects, the present invention provides an exploration process which consists of evaluating a plurality of geological regions which are candidates for massive sulphide deposits, identifying a site with a host lithography which is essentially acoustically transparent and carrying out a seismic investigation on the site.

Rather than simply applying the latest multi-dimensional seismic modeling techniques on all geologic regions suspected of bearing massive sulphide deposits, the present technique involves selecting only those geologic regions which have a particular range of characteristics, primarily those suspected of having a local host stratigraphy which is essentially acoustically transparent, and then applying seismic survey techniques only on those selected geologic regions.

The term 'acoustically transparent' as a characteristic of a local host stratigraphy, refers to the ability of seismic waves to pass through the stratigraphy, while producing minimal or otherwise substantially non-interfering seismic reflections from geological boundaries which are not the boundaries of massive sulphide contacts. For example, an acoustically transparent local host stratigraphy may be one in which a massive sulphide deposit generates a recognizable peak on an acoustic impedance trace that exceeds the accumulation of noise from the survey, for example the noise originating from the local host itself, that is geologic noise, and the noise originating from the seismic survey instruments themselves. The local host stratigraphy, in this case, is that which is in the vicinity of the massive sulphide itself, that is above and below the massive sulphide and not necessarily the entire depth investigation range of the geological terrain. In this case, a major 'marker' may be above or below the local host stratigraphy and could present a significant peak in an impedance trace but not otherwise substantially interfere with the acoustic transparency of the adjacent local host stratigraphy itself.

BRIEF DESCRIPTION OF THE DRAWINGS

Several preferred embodiments of the present invention will now be described, by way of example only, with reference to the appended drawing in which:

FIG. 1a is a schematic representation a geological region;

FIG. 1b is a schematic representation of an impedance log for the geological region of FIG. 1a;

FIG. 1c is a schematic representation of a synthetic seismogram of the geological region of FIG. 1a;

FIG. 1d is a schematic representation of another geological region;

FIG. 1e is a schematic representation of a synthetic seismogram for the geological region of FIG. 1d.

DETAILED DESCRIPTION OF THE PREFERRED EMBODIMENTS

The present technique is, at least in part, based on the proposition that these selected geologic regions, with an, essentially acoustically transparent local host stratigraphy should be the source for a relatively easily detected seismic reflection, namely one generated by a massive sulphide deposit. This is due to the relatively strong impedance contrast that usually exists between the massive sulphide deposit and their local host rocks. This means that reasonably straight-forward seismic techniques can be used to pinpoint approximate the size, depth, thickness and particular location of the massive sulphide deposit, without first having to deal with a significant interruptive signal level otherwise generated by the strata of the geologic regions not essentially acoustically transparent.

Desirably, a candidate geological region can be identified, in some cases, by the use of a comparatively straightforward 1-D seismic analysis of a bore hole, which can indicate, at least on a preliminary basis, the likelihood that the stratigraphy therein has the correct combination of velocity and density throughout its depth to have what may be a host lithology which presents a sufficiently acoustically transparent profile to make further seismic investigations worthwhile. A 1-D seismic analysis of this type can yield a useful plot (known in the field as a synthetic 'seismogram') based on the velocity and density measurements along the borehole, as is illustrated, for example, in FIGS. 1a to 1e.

Figures 1A, 1B, 1C:
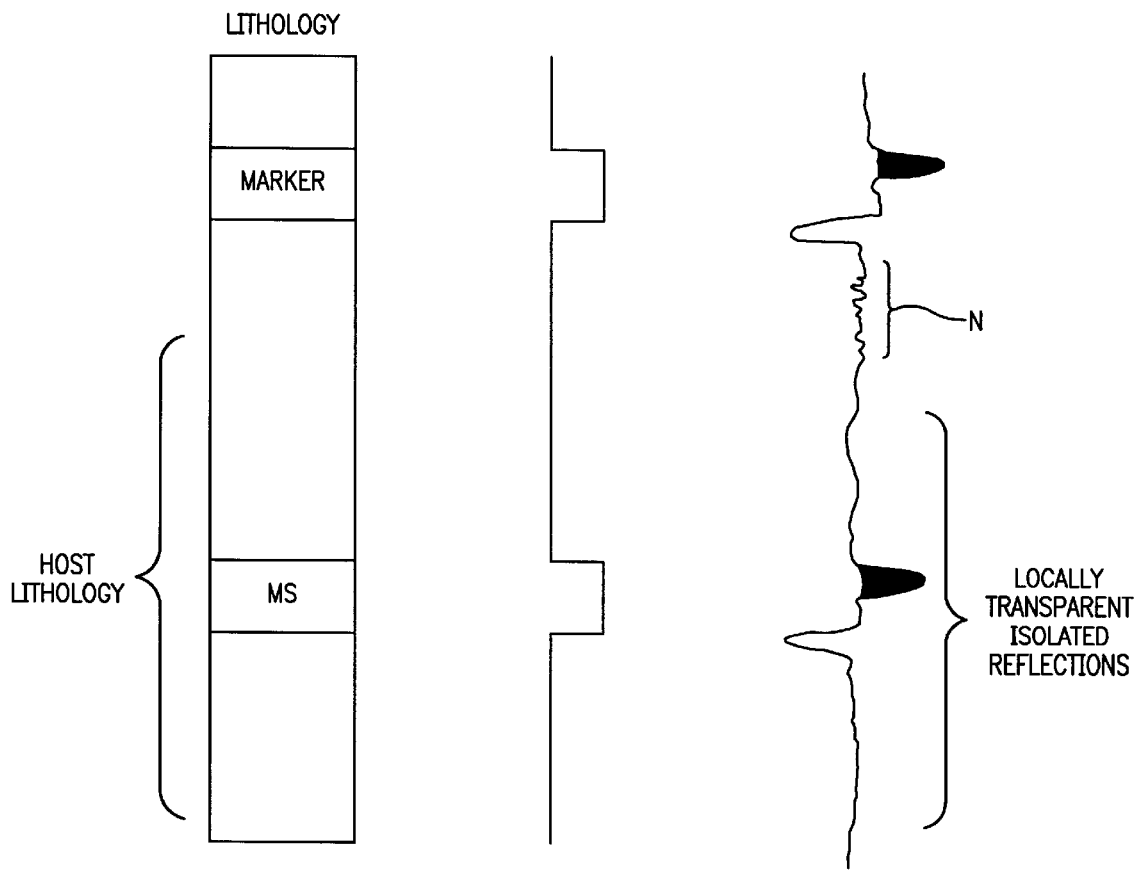

FIG. 1a shows, schematically, the cross section of one example of a desirable geological region, with the vertical dimension corresponding to the depth thereof. A massive sulphide deposit is shown by the block MS within a local host lithology which is below a major marker. FIG. 1b shows is a schematic view of an impedance log of that lithology indicating the impedance contrast for the marker as well as for the massive sulphide deposit itself, while the host lithology shows, in this particular example essentially no impedance contrast, it being understood that there may in fact be some residual impedance contrast depending on the nature of the geological region in question. FIG. 1c shows a synthetic seismogram trace indicating the seismic impulses at the leading and trailing edges of the geologic marker as well as at the massive sulphide deposit itself, while the local host lithology presents a relatively small disturbance apart from the geological and seismic noise, illustrated, for example at the region identified at 'N'. FIG. 1d in turn illustrates a similar geological region lithology to that shown in FIG. 1a, but in this case without the massive sulphide deposit of FIG. 1a. The synthetic seismogram for the geological region of FIG. 1d is shown in FIG. 1e which in this case has a similar curve to FIG. 1c, but without the two seismic impulses generated by the massive sulphide deposit.

Thus, the present process provides a method by which massive sulphide deposits can be detected by first selecting only those geologic regions whose stratigraphy are, for example, crystalline and which have a local host presenting an essentially acoustically transparent seismic profile. Conveniently, the present process may employ the 2-D and 3-D seismic technologies which are common to the petroleum industry.

Thus, the present process provides an exploration process which involves evaluating or surveying a plurality of geological regions which are candidates for massive sulphide deposits, identifying a site which has a host lithology is essentially acoustically transparent and carrying out a seismic investigation on the site. One example of the present procedure follows.

Rock Properties

The first step is to select a number of geological regions that are suspected of having the desired essentially acoustically transparent local host stratigraphy. Next, representative rock samples, both core and surface rocks if desired, may be collected and analyzed, for example at a laboratory bench, for velocity and density. If desired, the data may be analyzed in the form of graphs of density versus velocity for the purpose of identifying impedance markers, that is those impedance transitions in the strata that are likely to produce acoustic reflections. The greater the impedance changes from one strata to another, the greater the acoustic reflection as the wave passes through the transition. If there are one or more of these impedance markers in the local host lithology, the lithology may not be sufficiently acoustically transparent. On the other hand, the absence of these impedance markers in the local host lithology make the geologic region bearing the local host a candidate for further seismic analysis.

Borehole Logging

Once a candidate region has been identified, borehole data may be acquired, either by accessing already recorded data, if such exists for the candidate region, or by having dedicated boreholes sufficiently deep to pierce a significant portion of the stratigraphy of the terrain in order to measure the continuous ranges in density and velocity. This step can use a number of different borehole techniques including that referred to in the field as "slim hole" technology which uses bores less than 3 inches in diameter.

Numerical Modeling

A series of 1-D synthetic seismograms may be generated from the borehole data to evaluate reflectivity, resolution and signal-to-noise ratio, which are important to determine if the local host lithology is likely to be sufficiently acoustically transparent. The synthetic seismogram is a plot of the expected wave field response from a local hosting stratigraphy defined by the acoustic impedance log. A substantially acoustically transparent lithology should present a seismogram which is relatively featureless in the local host region thereof, one example of which is shown in FIG. 1e.

Field Test

Given the high cost of 3-D surveys, a 2-D test survey line may, if desired, be acquired across the proposed 3-D survey area to verify whether the candidate region in fact does possess a local host lithology with an acoustic transparency indicated by the earlier tests. The 2-D analysis results are also used to evaluate the proper locations and other parameters of both the seismic sources and receivers, offsets, fold, frequency content, signal-to-noise and other data acquisition and processing issues, which are well known to the petroleum industry and described in more detail in the references below.

3-D Exploration

Given the need to properly locate targets in 3-D space and the relative size of the potential targets compared to seismic wavelengths, 2-D surveys may not be adequate in many cases. It is from the 3-D survey and the subsequent analysis thereof that massive sulphide deposits, if they exist in a local host lithology of the candidate geological region, may be detected and, if so, at what size, depth and so on. These studies, per se, are straightforward and well known to those skilled in the art.

Figure 2:
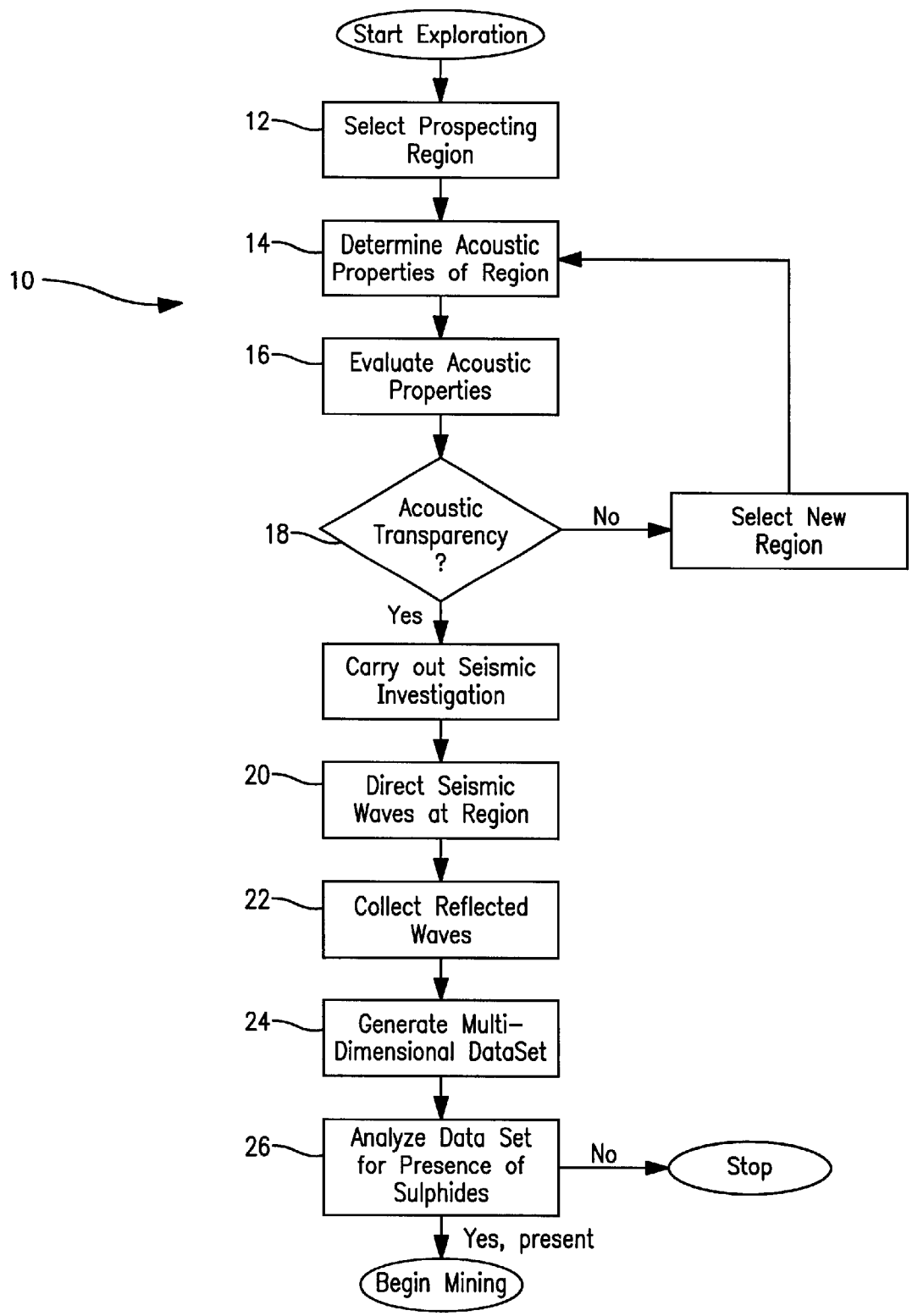
FIG. 2 is a flow chart of a seismic exploration process.

A technique of prospecting 10 for massive sulphide ore bodies starts by selecting a prospecting region 12 and then determining acoustic properties of the region at step 14 is shown in FIG. 2. The acoustic properties are evaluated at step 16 to determine whether a substantially acoustically transparent host lithology is present at step 18. If the transparent host lithology is present, then the seismic investigation is carried out by directing seismic waves at the transparent lithology at step 20 and collecting the reflected waves from the lithology at step 22. The reflected waves are then analyzed by creating a multidimensional data set that can contain two dimensional or three dimensional data at step 24. The presence of sulphides is determined through analysis of the data set at step 26, thereby either signaling the start of a mining evaluation program or stopping investigation in the selected region.

What is claimed is:

1. A method of exploration for evaluating a geological region for the suitability of direct detection of a massive sulphide deposit, the method comprising the steps of:

obtaining impedance characteristics for corresponding strata located in said geological region;

analyzing the impedance characteristics for determining the presence of impedance transitions from one of the strata to another;

validating the presence of a host lithology in said strata based on said impedance for determining said host lithology is substantially acoustically transparent;

whereby a seismic exploration is facilitated for said massive sulphide deposit in the substantially acoustically transparent host lithology.

2. The method of exploration according to claim 1, further comprising the steps of:

directing seismic waves at said host lithology and collecting reflected waves therefrom; and analyzing the reflected waves for the presence of said massive sulphide deposit.

3. The method of exploration according to claim 1, wherein the step of validating the acoustic transparency of said host lithology further includes the step of checking for the absence of a recognizable peak in said impedance characteristics that exceeds the accumulation of background noise.

4. The method of exploration according to claim 3, wherein said impedance characteristics are represented by a vertical seismic profile.

5. The method of exploration according to claim 3, wherein said recognizable peak represents a seismic reflection from a geological boundary contained within said strata of said host lithology.

6. The method of exploration according to claim 5, wherein said seismic reflection is from the geological boundary other than a boundary of said massive sulphide deposit.

7. The method of exploration according to claim 3, wherein the substantially acoustically transparent host lithology is represented by a seismic profile which contains a substantial absence of impedance markers of magnitude greater than that of the background noise.

8. The method of exploration according to claim 1, wherein the substantially acoustically transparent host lithology is represented by a seismic profile which contains a substantial absence of impedance markers of magnitude greater than that of the background noise.

9. The method of exploration according to claim 1, wherein said impedance characteristics are determined from velocity and density measurements of the strata in said geological region.

10. The method of exploration according to claim 1, wherein the step of validating further includes a verification process selected from the group comprising bore hole data, numerical modeling, and multidimensional field surveys.

\* \* \* \* \*